(12) United States Patent
Yanai et al.

(10) Patent No.: US 6,395,353 B2
(45) Date of Patent: May 28, 2002

(54) LIQUID CRYSTAL COMPOSITION AND LIQUID CRYSTAL DISPLAY ELEMENT

(75) Inventors: Motoki Yanai; Yasuhiro Kubo; Etsuo Nakagawa, all of Ichihara (JP)

(73) Assignees: Chisso Corporation, Osaka; Chisso Petrochemical Corporation, Tokyo, both of (JP)

(*) Notice: Subject to any disclaimer, the term of this patent is extended or adjusted under 35 U.S.C. 154(b) by 0 days.

(21) Appl. No.: 09/808,019

(22) Filed: Mar. 15, 2001

(30) Foreign Application Priority Data

Mar. 15, 2000 (JP) ........................................ 2000-072064

(51) Int. Cl.$^7$ .......................... C09K 19/30; C09K 19/20
(52) U.S. Cl. ............... 428/1.1; 252/299.63; 252/299.67
(58) Field of Search ........................ 252/299.63, 299.67; 428/1.1

(56) References Cited

U.S. PATENT DOCUMENTS 5,993,690 A    11/1999   Kondo et al. ............. 252/299.6

FOREIGN PATENT DOCUMENTS

| EP | 1114825 | * | 7/2001 |
|----|---------|---|--------|
| JP | 2001-31685 | * | 2/2001 |
| JP | 2001-31972 | * | 2/2001 |

\* cited by examiner

*Primary Examiner*—Shean C. Wu
(74) *Attorney, Agent, or Firm*—Wenderoth, Lind & Ponack, L.L.P.

(57) ABSTRACT

The present invention provides a liquid crystal composition comprising the compounds represented by the following formulas (I) and (II)

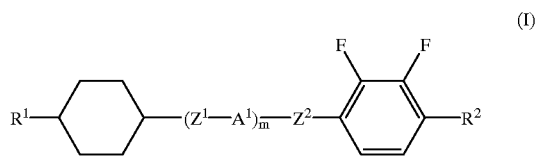

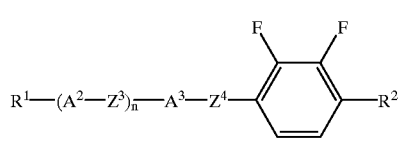

wherein each $R^1$ independently represents an alkyl group having 1–10 carbon atoms or an alkenyl group having 2–10 carbon atoms; each $R^2$ independently represents an alkyl or alkoxy group having 1–10 carbon atoms or an alkenyl group having 2–10 carbon atoms; $Z^1$ and $Z^2$ represent —$CH_2SiH_2$—, a single bond or —$CH_2CH_2$—, with the proviso that one of $Z^1$ and $Z^2$ represents —$CH_2SiH_2$— and the other represents a single bond or —$CH_2CH_2$—; $A^1$, $A^2$ and $A^3$ each independently represent a ring including aromatic, alicyclic and heterocyclic groups; m and n are each independently 0 or 1; and $Z^3$ and $Z^4$ each independently represent a single bond, —$CH_2CH_2$—, —$CF_2O$— or —$OCF_2$—. The composition has a suitable Δn, a low viscosity, a largely negative Δε and a broad nematic liquid crystal phase range while satisfying various properties required for liquid crystal compositions for AM-LCD.

5 Claims, No Drawings

LIQUID CRYSTAL COMPOSITION AND LIQUID CRYSTAL DISPLAY ELEMENT

FIELD OF THE INVENTION

The present invention relates to a nematic liquid crystal composition having a negative dielectric anisotropy and to a liquid crystal display element containing the composition. More particularly, it relates to a liquid crystal composition having a negative dielectric anisotropy which is used for an active matrix liquid crystal display element, and to a liquid crystal display element containing the composition.

BACKGROUND OF THE INVENTION

A liquid crystal display (LCD) element consumes less electric power, and can be downsized and save weight as compared with a cathode ray tube (CRT) display. Therefore, several kinds of liquid crystal display systems such as twist nematic (TN), super twist nematic (STN) and thin film transistor (TFT) modes have been put to practical use. Among them, an active matrix liquid crystal display element (AM-LCD) has been the focus of interest as the most expected system because of its advanced colorization and minuteness.

A liquid crystal composition used in AM-LCD is required to have the following properties:

1) high voltage holding ratio to maintain high contrast of the liquid crystal display element, 2) broad nematic phase range to cope with various environments, 3) suitable refractive anisotropy ($\Delta n$) in accordance with cell thickness, and 4) suitable threshold voltage in accordance with drive circuit.

A drive system of AM-LCD has mainly been TN mode in which twist angle of alignment of liquid crystal molecules between upper and lower electrode substrates is 90 degrees. However, it has a difficulty in applying for wide view displays because of the narrow view angle. Some modes for improving view angle have been proposed as follows:

a) IPS display mode in which a liquid crystal display element shows homogeneous alignment of liquid crystal molecules when voltage is unimpressed and the molecules rotate at an angle of 45 to 90 degrees within the same plane when voltage is impressed (R. Kiefer, B. Weber, F. Windscheid and G. Baur, In-Plane Switching of Nematic Liquid Crystals, JAPAN DISPLAY '92, p. 547; and b) VA display mode in which a liquid crystal display element shows homeotropic alignment when voltage is unimpressed and then shows horizontal alignment in one direction when voltage is impressed (K. Ohmuro, S. Kataoka, T. Sasaki and Y. Koike, Development of Super-High-Image-Quality Vertical-Alignment-Mode LCD, SID 97 Digest, p. 845).

These display systems have characteristics of quick response and high contrast in addition to the wide view angle. Further, they have a remarkable characteristic that they can comprise a liquid crystal composition having a negative dielectric anisotropy ($\Delta\epsilon$).

These drive systems utilize an electrically controlled birefringence mode. A product ($\Delta n \cdot d$) of refractive anisotropy ($\Delta n$) and cell thickness (d) should be, for example, $\Delta n \cdot d$=approx. 0.275 μm so as to provide a suitable contrast. Accordingly, a $\Delta n$ value should be 0.05 to 0.13 so as to obtain a cell thickness of 2 to 6 μm. Since response time is proportioned to viscosity of a liquid crystal composition (hereinafter referred to as η), a liquid crystal composition is required to have a small η. Further, threshold voltage decreases as an absolute value of dielectric anisotropy (hereinafter referred to as $\Delta\epsilon$) increases, and therefore, a liquid crystal composition is required to have a largely negative $\Delta\epsilon$.

Such a liquid crystal composition has been studied for various purposes, but is always required to be much more improved.

SUMMARY OF THE INVENTION

An object of the present invention is to provide a liquid crystal composition applicable for the display systems of the above a) and b), which can realize a wide view angle, a suitable $\Delta n$, and particularly a largely negative dielectric anisotropy, a broad range of nematic liquid crystal phase, a high voltage holding ratio and a low viscosity while satisfying various properties required for a liquid crystal composition for the AM-LCD.

The present inventors have studied liquid crystal compositions comprising various kinds of liquid crystalline compounds to solve the above problems, and found that the object can be achieved by a liquid crystal composition comprising several compounds as Components I to III, thus attaining the present invention.

The first liquid crystal composition of the present invention is described below in the items (1) and (2).

(1) A liquid crystal composition comprising Component I selected from the group consisting of the compounds represented by formula (I), Component II selected from the group consisting of the compounds represented by formula (II) and Component III selected from the group consisting of the compounds represented by formulas (III-1) and (III-2)

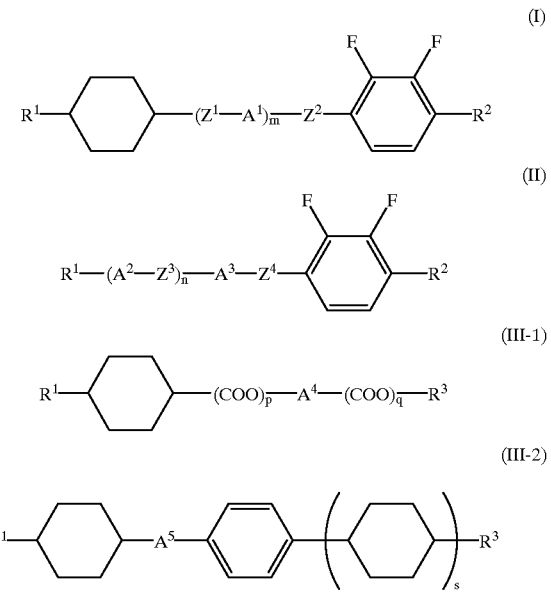

wherein each $R^1$ independently represents an alkyl group having 1–10 carbon atoms or an alkenyl group having 2–10 carbon atoms; each $R^2$ independently represents an alkyl or alkoxy group having 1–10 carbon atoms, or an alkenyl group having 2–10 carbon atoms; $Z^1$ and $Z^2$ represent —$CH_2SiH_2$—, a single bond or —$CH_2CH_2$—, with the proviso that one of $Z^1$ and $Z^2$ represents —$CH_2SiH_2$— and the other represents a single bond or —CH$_2$CH$_2$—; ring A$^1$ represents a trans-1,4-cyclohexylene group, or a 1,4-phenylene group in which one or more hydrogen atoms may be substituted with fluorine atoms; m is 0 or 1, with the proviso that when m is 0, Z$^2$ represents —CH$_2$SiH$_2$—; Z$^3$ and Z$^4$ each independently represent a single bond, —CH$_2$CH$_2$—, —CF$_2$O— or —OCF$_2$—; rings A$^2$ and A$^3$ represent a tetrahydropyran-2,5-diyl group, a trans-1,4-cyclohexylene group, a cyclohexa-1-ene-1,4-diyl group, or a 1,4-phenylene group in which one or more hydrogen atoms may be substituted with fluorine atoms; n is 0 or 1; with the proviso that when n=0 and Z$^4$ represents a single bond or —CH$_2$CH$_2$—, then ring A$^3$ represents a tetrahydropyran-2,5-diyl group; when n=0 and Z$^4$ represents —CF$_2$O— or —OCF$_2$—, then ring A$^3$ represents a trans-1,4-cyclohexylene group or a cyclohexa-1-ene-1,4-diyl group; when n=1 and Z$^3$ and Z$^4$ each independently represent a single bond or —CH$_2$CH$_2$—, then one of rings A$^2$ and A$^3$ represents a tetrahydropyran-2,5-diyl group; when n=1 and Z$^3$ and/or Z$^4$ represent —CF$_2$O— or —OCF$_2$—, then rings A$^2$ and A$^3$ represent a trans-1,4-cyclohexylene group, a cyclohexa-1-ene-1,4-diyl group, or a 1,4-phenylene group in which one or more hydrogen atoms may be substituted with fluorine atoms; each R$^3$ independently represents an alkyl group having 1–10 carbon atoms or an alkenyl group having 2–10 carbon atoms, in which one —CH$_2$— may be substituted with —O—; ring A$^4$ represents a 1,4-phenylene group or a trans-1,4-cyclohexylene group; ring A$^5$ represents a trans-1,4-cyclohexylene group, or a 1,4-phenylene group in which one or more hydrogen atoms may be substituted with fluorine atoms; p, q and s are each independently 0 or 1 with the proviso that (p+q) is 0 or 1.

(2) A liquid crystal composition as described in the above item (1), which comprises 3–80% by weight of Component I, 3–80% by weight of Component II and 1–80% by weight of Component III.

The second liquid crystal composition of the present invention is described below in the item (3).

(3) A liquid crystal composition as described in the above item (1) or (2), which further comprises Component IV selected from the group consisting of the compounds represented by formula (IV)

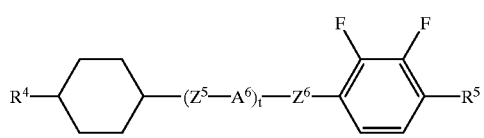

(IV)

wherein R$^4$ represents an alkyl group having 1–10 carbon atoms or an alkenyl group having 2–10 carbon atoms, R$^5$ represents an alkyl or alkoxy group having 1–10 carbon atoms or an alkenyl group having 2–10 carbon atoms, Z$^5$ and Z$^6$ each independently represent a single bond or —CH$_2$CH$_2$—, ring A$^6$ represents a 1,4-phenylene group or a trans-1,4-cyclohexylene group, and t is 0 or 1.

The third liquid crystal composition of the present invention is described below in the item (4).

(4) A liquid crystal composition as described in any one of the items (1) to (3), wherein the clearing point (Tc) is 60 to 100° C., the refractive anisotropy (Δn) is 0.06 to 0.12 and the dielectric anisotropy (Δε) is −6 to −1.

The liquid crystal display element of the present invention is described below in the item (5).

(5) A liquid crystal display element containing the liquid crystal composition as described in any one of the items (1) to (4).

DETAILED DESCRIPTION OF THE INVENTION

Component I of the liquid crystal composition according to the present invention comprises the compounds represented by formula (I), wherein the clearing point (Tc) is in the range of −50 to 100° C., the refractive anisotropy (Δn) is in the range of 0.05 to 0.170, and the dielectric anisotropy (Δε) is in the range of −6 to −3. It is superior in heat stability and chemical stability, and plays a role of decreasing the threshold voltage of a liquid crystal composition for TFT which requires high reliability. However, when a composition having a negative Δε is prepared only from Component I, the composition may not have a high clearing point (Tc) or a suitable Δn, and compatibility of the composition at low temperature may be lowered.

Among the compounds represented by formula (I) as Component I, the following compounds are preferable. In the formulas, R$^1$ and R$^2$ each have the same meaning as defined above.

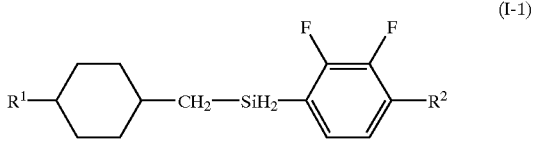

(I-1)

(I-2)

(I-3)

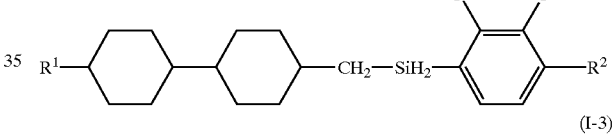

(I-4)

(I-5)

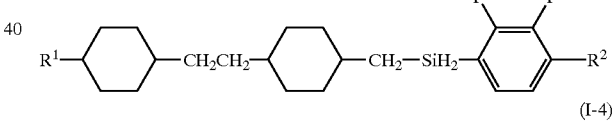

(I-6)

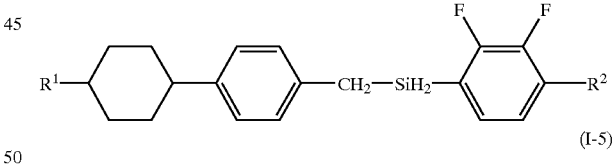

(I-7)

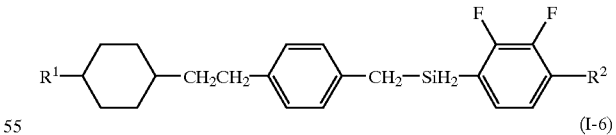

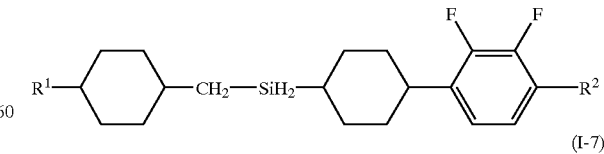

(I-8)
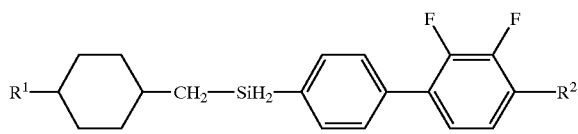

(I-9)
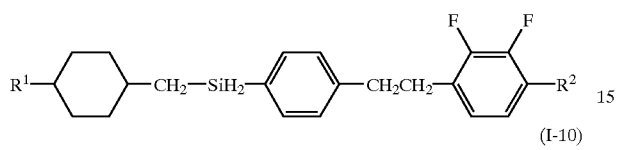

(I-10)
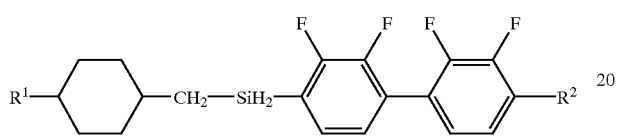

Component II comprises the compounds represented by formula (II), wherein the clearing point (Tc) is in the range of −20 to 160° C., the refractive anisotropy (Δn) is in the range of 0.05 to 0.170, and the dielectric anisotropy (Δε) is in the range of −7 to −3. It is superior in heat stability and chemical stability, and plays a role of decreasing the threshold voltage of a liquid crystal composition for TFT which requires high reliability. However, when a composition having a negative Δε is prepared only from Component II, compatibility of the composition at low temperature may be unfavorably lowered.

Among the compounds represented by formula (II) as Component II, the following compounds are preferable. In the formulas, $R^1$ and $R^2$ each have the same meaning as defined above.

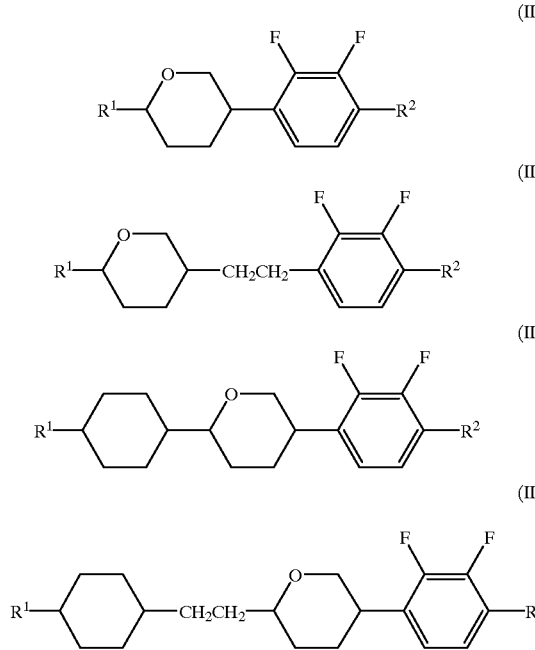

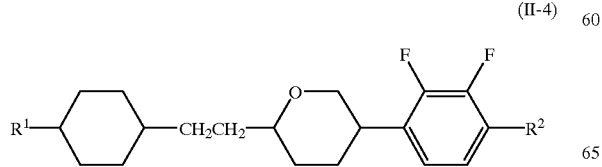

(II-5)
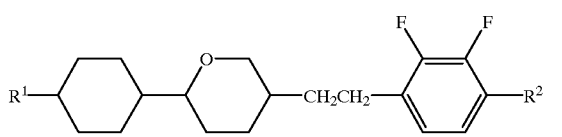

(II-6)
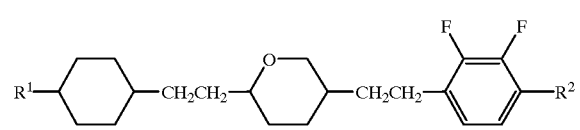

(II-7)
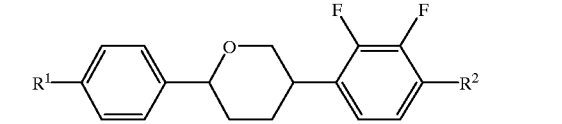

(II-8)
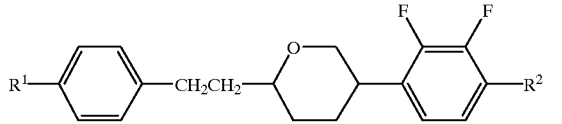

(II-9)
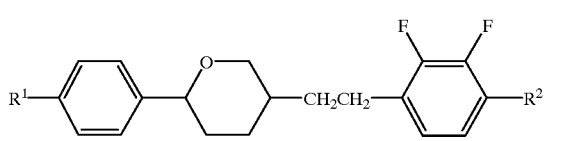

(II-10)
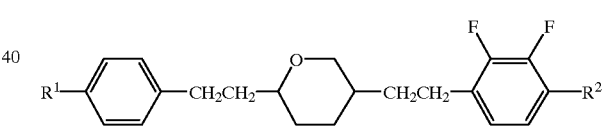

(II-11)
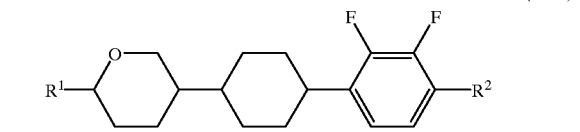

(II-12)
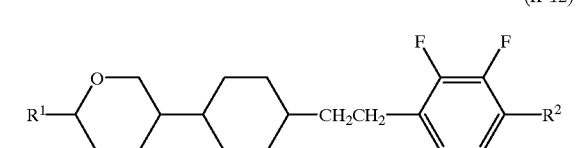

(II-13)
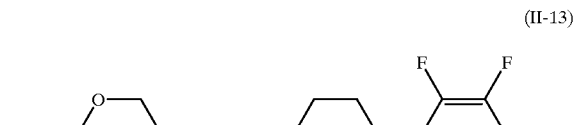

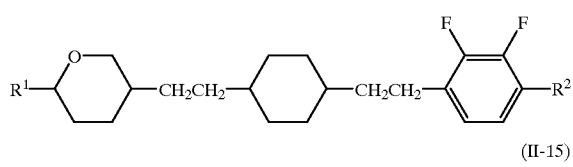
(II-14)
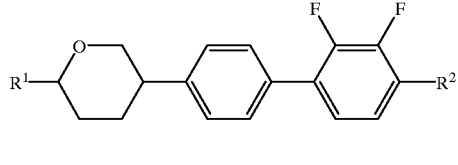
(II-15)
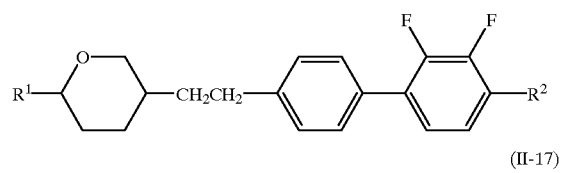
(II-16)
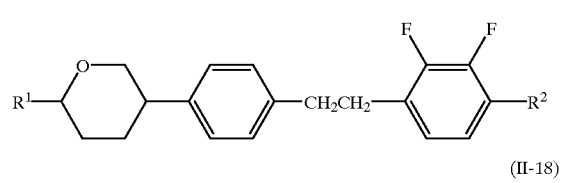
(II-17)
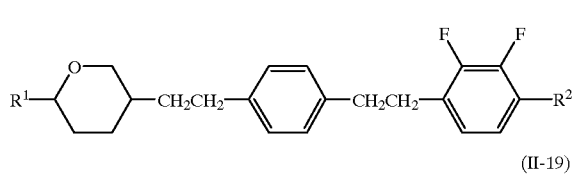
(II-18)
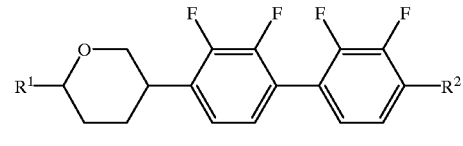
(II-19)
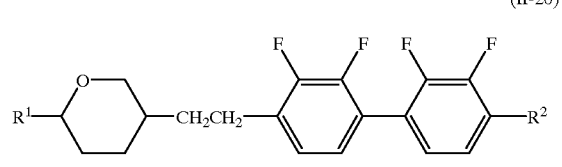
(II-20)
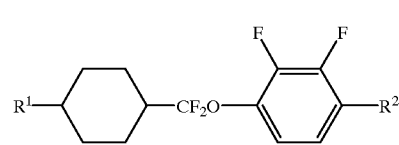
(II-21)
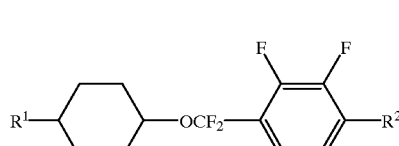
(II-22)
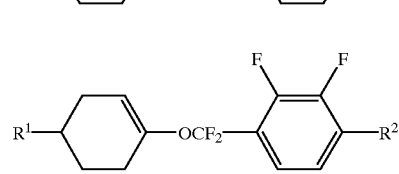
(II-23)
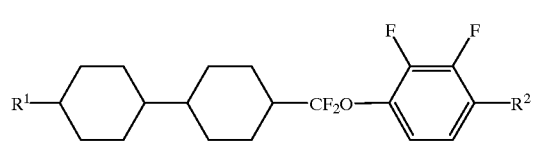
(II-24)
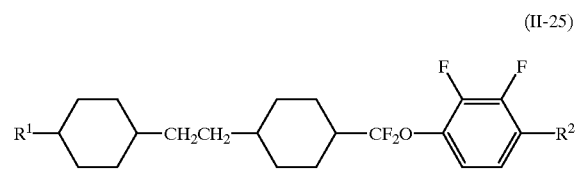
(II-25)
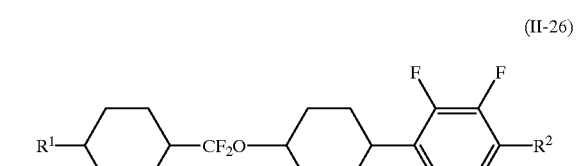
(II-26)
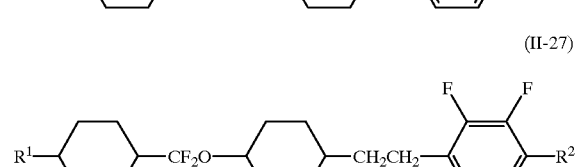
(II-27)
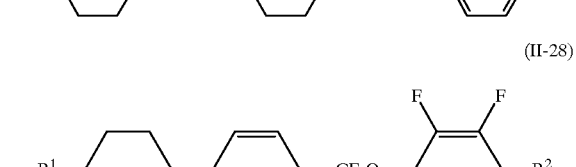
(II-28)
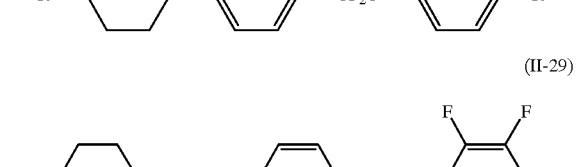
(II-29)
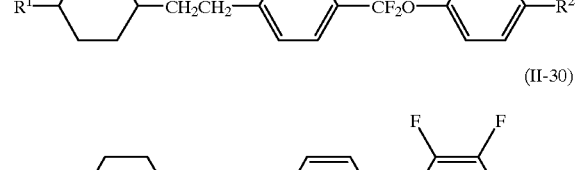
(II-30)
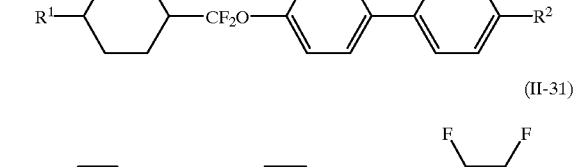
(II-31)
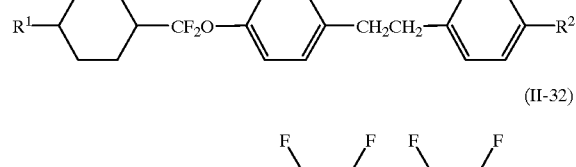
(II-32)
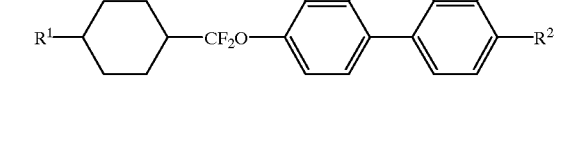

(II-33) 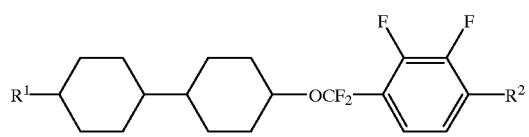

(II-34) 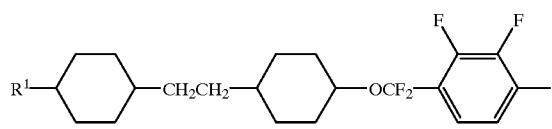

(II-35) 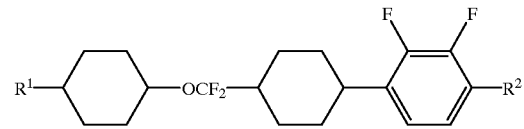

(II-36) 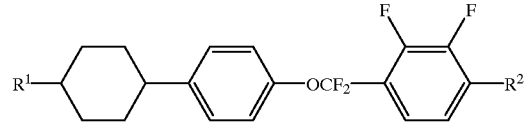

(II-37) 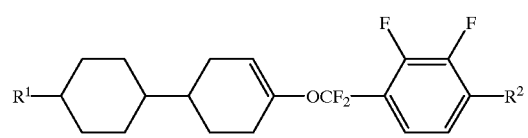

(II-38) 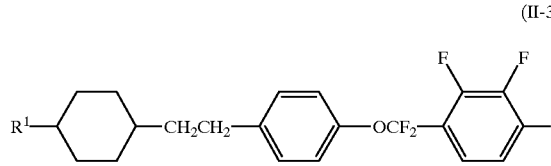

(II-39) 

(II-40) 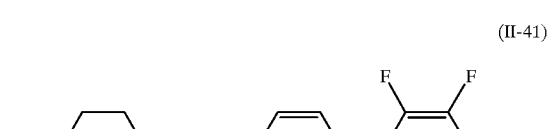

(II-41)

(II-42) 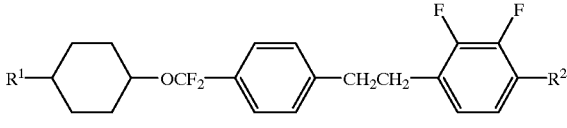

(II-43) (II-44) 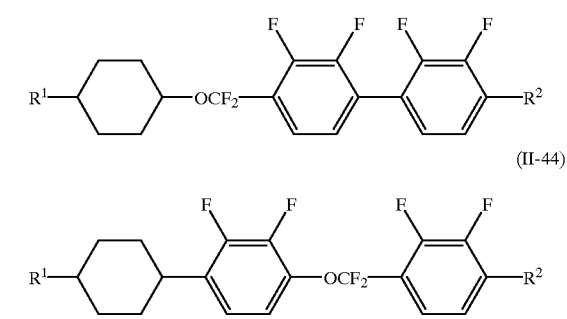

Component III comprises the compounds represented by formulas (III-1) and (III-2).

The compound represented by formula (III-1) has a clearing point (Tc) of 20 to 80° C., a refractive anisotropy (Δn) of 0.01 to 0.08 and a dielectric anisotropy (Δε) of approx. −1 to 0 as well as a low viscosity. It is superior in heat stability, chemical stability and compatibility, and plays a role of reducing Δn and viscosity, and adjusting Δε of the composition.

The compound represented by formula (III-2) has a clearing point (Tc) of 140 to 260° C., a refractive anisotropy (Δn) of 0.10 to 0.20 and a dielectric anisotropy (Δε) of approx. 0. It is superior in heat stability, chemical stability and compatibility, and plays a role of adjusting Δε as well as elevating the clearing point (Tc) of the composition. That is, Component III can provide a composition having a well-adjusted clearing point (Tc), refractive anisotropy (Δn) and dielectric anisotropy (Δε), as well as a low viscosity and an excellent compatibility at low temperature.

Among the compounds represented by formulas (III-1) and (III-2) as Component III, the following compounds are preferable. In the formulas, $R^1$ and $R^2$ each have the same meaning as defined above.

(III-1-1) 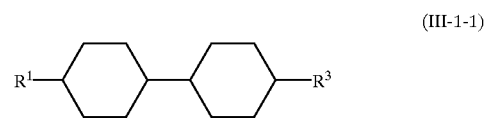

(III-1-2) 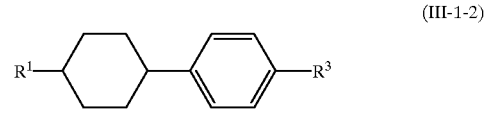

(III-1-3) 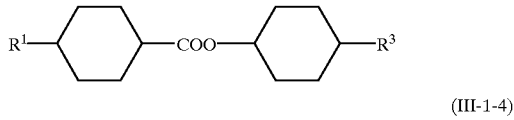

(III-1-4) 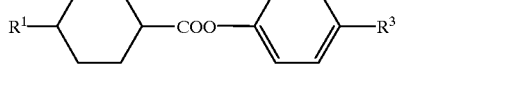

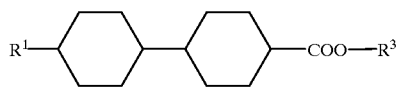
(III-1-5)

(III-2-1)

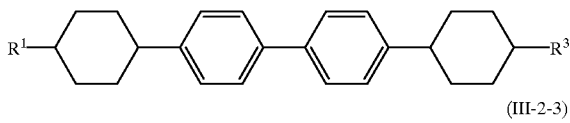
(III-2-2)

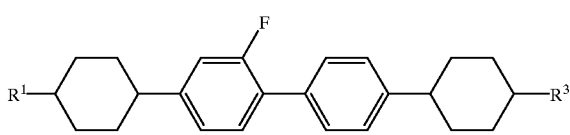
(III-2-3)

Any combination of several kinds of compounds selected from Components I, II and III, respectively, can provide a liquid crystal composition for AM-LCD having a suitable Δn, a low viscosity, a largely negative dielectric anisotropy, a broad nematic liquid crystal phase range and a high voltage holding ratio (VHR). Further, it can provide a composition having a clearing point (Tc) of 60 to 100° C., a refractive anisotropy (Δn) of 0.06 to 0.12, a dielectric anisotropy (Δε) of −6 to −1, a low viscosity and a broad nematic liquid crystal phase range.

Component IV comprises the compounds represented by formula (IV), which has a clearing point (Tc) of −20 to 180° C., a refractive anisotropy (Δn) of 0.06 to 0.21 and a dielectric anisotropy (Δε) of approx. −7 to −3. It is superior in heat stability and chemical stability, and plays a role of decreasing threshold voltage of a liquid crystal composition for TFT which requires high reliability.

Any combination of several kinds of compounds selected from Components I to IV, respectively, can provide the present liquid crystal composition for AM-LCD having a suitable Δn, a largely negative dielectric anisotropy, a low viscosity, a broad nematic liquid crystal phase range and a high voltage holding ratio (VHR).

In the liquid crystal composition of the present invention, the amount of Component I is preferably from 3 to 80% by weight. More preferably it is 5 to 75% by weight. If the amount is less than 3% by weight, the liquid crystal composition may unfavorably have the small absolute value of Δε (negative value) and the elevated threshold voltage. If the amount is more than 80% by weight, the compatibility at low temperature may unfavorably be lowered.

The amount of Component II is preferably from 3 to 80% by weight. More preferably it is 5 to 75% by weight. If the amount is less than 3% by weight, the liquid crystal composition may unfavorably have the small absolute value of Δε (negative value). If the amount is more than 80% by weight, the compatibility at low temperature may unfavorably be lowered.

The amount of Component III is preferably 80% by weight or less. If the amount is more than 80% by weight, the liquid crystal composition may unfavorably have the small absolute value of Δε (negative value) and the elevated threshold voltage.

The compounds contained as components in the liquid crystal composition of the present invention can be synthesized by the methods described in the following references.

Regarding the compounds represented by formula (III-1) as Component III, JP-A 59–70624 and JP-A 60–16940 describe methods for preparation of the compounds represented by formula (III-1-1), and JP-A 54–27546 describes a method for preparation of the compounds represented by formula (III-1-4), respectively.

Regarding the compounds represented by formula (III-2) as Component III, JP-A 57–165328 describes a method for preparation of the compounds represented by formula in (III-2-1).

Regarding the compounds represented by formula (II) as Component II, the compounds having a pyran ring represented by formulas (II-1) to (II-20) can be prepared by hydrosilylation (G. A. Kraus et al., J. Org. Chem., 46, 2417 (1981), G. A. Kraus et al., J. Chem. Soc., Chem. Commun., 1568, (1986)) of the compounds obtained from aldehyde derivatives and bromoacetic esters by Refomatsky reaction (M. W. RATHKE et al., J. O. C., 35 (11), 3966 (1970), J. F. RUPPERT et al., J. O. C., 39(2), 269 (1974)), the method of P. PICARD et al. (Synthesis, 550 (1981)), the method of Yamaguchi et al. (Tetrahedron Lett., 25(11), 1159 (1984)) and the like.

Regarding the compounds represented by formulas (II-21) to (II-43), the compounds represented by formulas (II-22), (II-23) and (II-33) to (II-43) which have —OCF$_2$— as a connecting group can be obtained by reacting carboxylic acid derivatives with phenols or alcohols, carrying out condensation reaction by dehydration to synthesize compounds having an ester group as a connecting group, and then reacting the resultant ester derivatives with a publicly known sulfurization agent such as Lawson's reagent to synthesize compounds having a thiocarbonyl group, followed by fluorinating the compounds using fluorinating agents such as hydrogen fluoride pyridine (M. Kuroboshi et al., Chem. Lett., 827, 1992) and diethylaminosulfur trifluoride (William H. Bunnelle et al., J. Org. Chem. 1990, 55, 768).

The compounds represented by formulas (II-21), (II-24) to (II-32) can be similarly synthesized.

JP-A 6-228037 describes a method for preparation of the compounds represented by formula (IV) as Component IV.

The compounds represented by formula (I) as Component I can be synthesized by the same procedure as the compounds represented by formula (IV), and a preparation method of compounds having a silicon bond between rings is described in WO 97/05144. Thus, each of the compounds as the component of the present liquid crystal composition can be synthesized according to the prior art.

The liquid crystal compositions of the present invention can be prepared by conventional methods per se. Typically, various components are mixed and dissolved with each other at high temperature.

The liquid crystal compositions of the present invention can also be used for guest-host (GH) mode displays with the addition of dichromatic dyes such as merocyanine, styryl, azo, azomethine, azoxy, quinophthalone, anthraquinone and tetrazine. The liquid crystal compositions of the present invention can also be used for NCAP which is produced by microencapsulating nematic liquid crystals, or polymer dispersed liquid crystal display (PDLCD) element which is typified by the polymer network liquid crystal display (PNLCD) element in which a three-dimensional matrix is formed in liquid crystals. The compositions can also be used with the addition of at least one chiral compound. In addition, the compositions can also be used for electrically controlled birefringence (ECB) mode or dynamic scattering (DS) mode displays.

The present invention will be described in detail by the following examples, but not limited thereto. In examples and comparative examples, all the composition ratios are indicated in terms of percentage by weight and the compounds used are represented by symbols as defined in Table 1. Property data of the liquid crystal compositions are shown in terms of clearing point (Tc), lower temperature limit of the nematic liquid crystal phase ($T_L$), refractive anisotropy at 25° C. ($\Delta n$), dielectric anisotropy at 25° C. ($\Delta \epsilon$), viscosity at 20° C. ($\eta_{20}$) and voltage holding ratio at 25° C. and 80° C. (VHR(25° C.) and VHR(80° C.)). $T_L$ was determined by the liquid crystal phase after the composition was allowed to stand for 30 days in the respective freezers at 0° C., −10° C., −20° C., −30° C. and −40° C. $\Delta\epsilon(=\epsilon_{PA}-\epsilon_{PE})$ is obtained by measuring $\epsilon_{PA}$ (dielectric constant in the direction parallel to symmetrical axis) and $\epsilon_{PE}$ (dielectric constant in the direction perpendicular to symmetrical axis) using homeotropically aligned cells and homogeneously aligned cells. Voltage holding ratios (VHR) at 25° C. and 80° C. were measured by an area method using TN cell, in which a holding period was 16.6 msec and PIA-5210 manufactured by Chisso Corporation was used as an aligning film.

TABLE 1

Method for Designating Compounds by Using Symbols

—R—(A₁)—Z₁— --- —Zₙ—(Aₙ)—X

| 1) Left Terminal Group R— | Symbol | 3) Bonding Group —$Z_1$—, —$Z_n$— | Symbol |
|---|---|---|---|
| $C_nH_{2n+1}$— | n- | —$CH_2$— | 1 |
| $C_nH_{2n+1}OC_mH_{2m}$— | nOm- | —$SiH_2$— | Si |
| $CH_2$=CH— | V- | —$C_2H_4$— | 2 |
| $CH_2$=$CHC_nH_{2n}$— | Vn- | —COO— | E |
| $C_nH_{2n+1}CH$=$CHC_mH_{2m}$— | nVm- | —$CF_2O$— | CF2O |
| | | —$OCF_2$— | OCF2 |

| 2) Ring Structure —(A₁)—, —(Aₙ)— | Symbol | 4) Right Terminal Group-X | Symbol |
|---|---|---|---|
|  | H | —$C_nH_{2n+1}$ | -n |
| 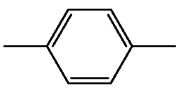 | B | —$OC_nH_{2n+1}$ | —On |
| 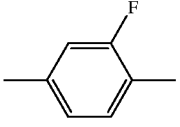 | B(F) | —$COOCH_3$ | —EMe |
| 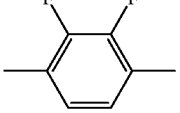 | B(2F,3F) | —$C_nH_{2n}OC_mH_{2m+1}$ | -nOm |
| 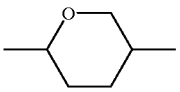 | Dh | | |
| 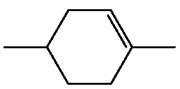 | Ch | | |

5) Examples of Designation

Example 1:  V2-H1SiB(2F,3F)-O2

TABLE 1-continued

Method for Designating Compounds by Using Symbols

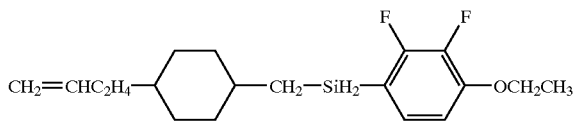

Example 2: 1O1-HBBH-4

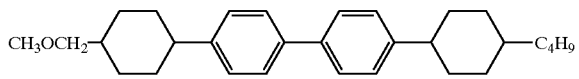

JP-A 6–228037 discloses an example of compounds having a negative $\Delta\epsilon$ and compositions comprising them. Compositions A and C, which were disclosed in Examples 26 and 27 of the gazette, respectively, were prepared to measure the above physical properties.

Comparative Example 1 (Composition A)

| 3-HBB(2F,3F)-1O1 | 10.0% |
|---|---|
| ZLI-1132 | 90.0% |

(Commercially available liquid crystal compound produced by Merck)

Tc=74.9° C.
$T_L$<−20° C.
$\Delta n$=0.139
$\Delta\epsilon$=9.7
$\eta_{20}$=29.2 mpa·s
VHR(25° C.)=95.8%
VHR(80° C.)=48.5%

The composition of Comparative Example 1 has a positive $\Delta\epsilon$ and a remarkably low voltage holding ratio (VHR).

Comparative Example 2 (Composition C)

| 5-HHB(2F,3F)-1O1 | 10.0% |
|---|---|
| ZLI-1132 | 90.0% |

Tc=77.0° C.
$T_L$<−20° C.
$\Delta n$=0.133
$\Delta\epsilon$=9.7
$\eta_{20}$=29.1 mPa·s
VHR(25° C.)=96.1%
VHR(80° C.)=48.7%

The composition of Comparative Example 2 has a positive $\Delta\epsilon$ and a remarkably low voltage holding ratio (VHR).

Since the compositions of Comparative Examples 1 and 2 contain a large amount of compounds having a cyano group, the voltage holding ratio (VHR) of the composition becomes so small that the composition cannot apply for AM-LCD, and $\Delta\epsilon$ is a positive value.

EXAMPLE 1

The composition comprising the following components was prepared.

| Component I | |
|---|---|
| 3-H1SiB(2F,3F)-O2 | 6.0% |
| 5-H1SiB(2F,3F)-O2 | 5.0% |
| 3-HH1SiB(2F,3F)-1 | 5.0% |
| 2-HH1SiB(2F,3F)-O2 | 12.0% |
| 3-HH1SiB(2F,3F)-O2 | 9.0% |
| 3-HH1SiB(2F,3F)-O3 | 5.0% |
| 3-HB1SiB(2F,3F)-O2 | 3.0% |
| Component II | |
| 3-DhB(2F,3F)-O2 | 5.0% |
| 3-HDhB(2F,3F)-O2 | 10.0% |
| 5-HDhB(2F,3F)-O2 | 10.0% |
| 5-HHCF2OB(2F,3F)-O2 | 10.0% |
| 3-HHOCF2B(2F,3F)-O1 | 5.0% |
| 3-HB(2F,3F)OCF2B(2F,3F)-O1 | 5.0% |
| Component III | |
| 3-HH-4 | 4.0% |
| 3-HB-O2 | 3.0% |
| 3-HH-EMe | 3.0% |

The composition had the following physical properties:

Tc=75.0° C.
$T_L$<−20° C.
$\Delta n$=0.096
$\Delta\epsilon$=−4.6
$\eta_{20}$=37.8 mPa·s
VHR(25° C.)=99.1%
VHR(80° C.)=98.1%

The composition of Example 1 has an especially largely negative $\Delta\epsilon$ and a very large voltage holding ratio (VHR) as compared with those of Comparative Examples 1 and 2. Accordingly, it is suitable for the display systems of the above a) and b).

EXAMPLE 2

The composition comprising the following components was prepared.

| Component I | |
|---|---|
| 3-H1SiB(2F,3F)-O2 | 12.0% |
| 5-H1SiB(2F,3F)-O2 | 12.0% |
| 2-HH1SiB(2F,3F)-O2 | 15.0% |
| 3-HH1SiB(2F,3F)-O2 | 13.0% |
| 3-HH1SiB(2F,3F)-O3 | 13.0% |
| 3-H1SiHB(2F,3F)-O2 | 3.0% |
| 3-H1SiBB(2F,3F)-O2 | 3.0% |
| Component II | |
| 3-HDhB(2F,3F)-O2 | 4.0% |
| 5-HDhB(2F,3F)-O2 | 4.0% |
| 3-BDhB(2F,3F)-O2 | 3.0% |
| Component III | |
| 3-HB-O2 | 4.0% |
| 3-HHB-1 | 8.0% |
| 3-HHB-O1 | 6.0% |

The composition had the following physical properties:
Tc=60.1° C.
$T_L < -20°$ C.
$\Delta n = 0.098$
$\Delta \epsilon = -3.6$
$\eta_{20} = 31.0$ mPa·s
VHR(25° C.)=99.2%
VHR(80° C.)=98.4%

EXAMPLE 3

The composition comprising the following components was prepared.

| Component I | |
|---|---|
| V-H1SiB(2F,3F)-O2 | 3.0% |
| 3-H1SiB(2F,3F)-O2 | 9.0% |
| 5-H1SiB(2F,3F)-O2 | 12.0% |
| 3-HH1SiB(2F,3F)-1 | 5.0% |
| 2-HH1SiB(2F,3F)-O2 | 15.0% |
| 3-HH1SiB(2F,3F)-O2 | 10.0% |
| 3-HH1SiB(2F,3F)-O3 | 15.0% |
| 3-H2H1SiB(2F,3F)-O2 | 5.0% |
| Component II | |
| 5-HHCF2OB(2F,3F)-O2 | 6.0% |
| 5-HBCF2OB(2F,3F)-O2 | 5.0% |
| Component III | |
| 3-HB-O2 | 4.0% |
| 3-HHB-O1 | 3.0% |
| 1O1-HBBH-4 | 4.0% |
| 3-HBBH-3 | 4.0% |

The composition had the following physical properties:
Tc=65.5° C.
$T_L < -20°$ C.
$\Delta n = 0.101$
$\Delta \epsilon = -3.5$
$\eta_{20} = 32.0$ mPa·s
VHR(25° C.)=99.0%
VHR(80° C.)=98.4%

EXAMPLE 4

The composition comprising the following components was prepared.

| Component I | |
|---|---|
| 3-H1SiB(2F,3F)-O2 | 9.0% |
| 5-H1SiB(2F,3F)-O2 | 9.0% |
| 3-HH1SiB(2F,3F)-1 | 6.0% |
| 2-HH1SiB(2F,3F)-O2 | 15.0% |
| 3-HH1SiB(2F,3F)-O2 | 13.0% |
| 3-HH1SiB(2F,3F)-O3 | 13.0% |
| 3-H1SiB(2F,3F)-O2 | 3.0% |
| 3-H1SiBB(2F,3F)-O2 | 3.0% |
| Component II | |
| 3-BDhB(2F,3F)-O2 | 6.0% |
| 5-HHCF2OB(2F,3F)-O2 | 3.0% |
| 5-HBCF2OB(2F,3F)-O2 | 3.0% |
| 3-HB(2F,3F)OCF2B(2F,3F)-O1 | 4.0% |
| Component III | |
| 3-HB-O2 | 5.0% |
| 3-HHB-3 | 8.0% |

The composition had the following physical properties:
Tc=60.2° C.
$T_L < -20°$ C.
$\Delta n = 0.100$
$\Delta \epsilon = -3.9$
$\eta_{20} = 30.0$ mPa·s
VHR(25° C.)=99.2%
VHR(80° C.)=98.0%

EXAMPLE 5

The composition comprising the following components was prepared.

| Component I | |
|---|---|
| 3-H1SiB(2F,3F)-O2 | 6.0% |
| 2-HH1SiB(2F,3F)-O2 | 3.0% |
| 3-HH1SiB(2F,3F)-O2 | 3.0% |
| Component II | |
| 3-DhB(2F,3F)-O2 | 7.0% |
| 3-Dh2B(2F,3F)-O2 | 3.0% |
| 3-HDhB(2F,3F)-O2 | 10.0% |
| 5-HDhB(2F,3F)-O2 | 10.0% |
| 3-H2DhB(2F,3F)-O2 | 5.0% |
| 3-BDhB(2F,3F)-O2 | 16.0% |
| 5-BDhB(2F,3F)-O2 | 16.0% |
| 3-DhHB(2F,3F)-O2 | 5.0% |
| Component III | |
| 3-HH-4 | 3.0% |
| 1O1-HH-3 | 3.0% |
| 3-HB-O2 | 3.0% |
| 3-HB-O4 | 4.0% |
| 3-HEH-5 | 3.0% |

The composition had the following physical properties:
Tc=75.5° C.
$T_L < -20°$ C.
$\Delta n = 0.102$
$\Delta \epsilon = -4.7$
$\eta_{20} = 40.7$ mPa·s

EXAMPLE 6

The composition comprising the following components was prepared.

| Component I | |
|---|---|
| 3-H1SiB(2F,3F)-O2 | 6.0% |
| 2-HH1SiB(2F,3F)-1 | 4.0% |
| 3-HH1SiB(2F,3F)-O2 | 4.0% |
| Component II | |
| 3-HCF2OB(2F,3F)-O2 | 3.0% |
| 3-HOCF2B(2F,3F)-O2 | 3.0% |
| 3-ChOCF2B(2F,3F)-O2 | 3.0% |
| 3-HHCF2OB(2F,3F)-O1 | 5.0% |
| 5-HHCF2OB(2F,3F)-O2 | 9.0% |
| 3-HBCF2OB(2F,3F)-O2 | 7.0% |
| 5-HBCF2OB(2F,3F)-O2 | 7.0% |
| 3-HChOCF2B(2F,3F)-O1 | 14.0% |
| 3-HHOCF2B(2F,3F)-O1 | 4.0% |
| 3-HBOCF2B(2F,3F)-O1 | 4.0% |
| 3-HOCF2B(2F,3F)B(2F,3F)-O1 | 4.0% |
| Component III | |
| 3-HH-4 | 5.0% |
| 3-HB-O2 | 6.0% |
| 3-HB-O4 | 4.0% |
| 3-HH-EMe | 4.0% |
| 3-HHB-1 | 4.0% |

The composition had the following physical properties:
Tc=80.1° C.
$T_L$<−20° C.
Δn=0.094
Δε=−3.1
$\eta_{20}$=36.1 mPa·s

EXAMPLE 7

The composition comprising the following components was prepared.

| Component I | |
|---|---|
| 3-H1SiB(2F,3F)-O2 | 5.0% |
| 2-HH1SiB(2F,3F)-O2 | 4.0% |
| Component II | |
| 3-DhB(2F,3F)-O2 | 5.0% |
| 3-HDhB(2F,3F)-O2 | 12.0% |
| 5-HDhB(2F,3F)-O2 | 8.0% |
| 3-BDhB(2F,3F)-O2 | 5.0% |
| 5-BDhB(2F,3F)-O2 | 5.0% |
| 3-DhB(2F,3F)B(2F,3F)-O2 | 4.0% |
| 5-HHCF2OB(2F,3F)-O2 | 5.0% |
| 5-HBCF2OB(2F,3F)-O2 | 6.0% |
| 3-HCF2OHB(2F,3F)-O2 | 5.0% |
| 3-HChOCF2B(2F,3F)-O1 | 5.0% |
| 3-HCF2OBB(2F,3F)-O2 | 5.0% |
| 3-HBOCF2B(2F,3F)-O1 | 5.0% |
| 3-HB(2F,3F)OCF2B(2F,3F)-O1 | 5.0% |
| Component III | |
| 3-HH-4 | 8.0% |
| 3-HB-O2 | 4.0% |
| 3-HH-EMe | 4.0% |

The composition had the following physical properties:
Tc=94.0° C.
$T_L$<−20° C.
Δn=0.099
Δε=−4.5
$\eta_{20}$=42.0 mPa·s

EXAMPLE 8

The composition comprising the following components was prepared.

| Component I | |
|---|---|
| 3-H1SiB(2F,3F)-O2 | 5.0% |
| V2-H1SiB(2F,3F)-O2 | 5.0% |
| 2-HH1SiB(2F,3F)-O2 | 7.0% |
| 3-HH1SiB(2F,3F)-V | 3.0% |
| 3-HH1SiB(2F,3F)-O2 | 12.0% |
| 3-HH1SiB(2F,3F)-O3 | 7.0% |
| 1V2-HH1SiB(2F,3F)-O2 | 5.0% |
| Component II | |
| 3-DhB(2F,3F)-O2 | 7.0% |
| 3-HDhB(2F,3F)-O2 | 10.0% |
| V2-HDhB(2F,3F)-O2 | 5.0% |
| 5-HDhB(2F,3F)-O2 | 15.0% |
| 3-BDhB(2F,3F)-O2 | 4.0% |
| 5-BDhB(2F,3F)-O2 | 4.0% |
| Component III | |
| 3-HH-4 | 3.0% |
| 3-HB-O2 | 4.0% |
| V-HHB-3 | 4.0% |

The composition had the following physical properties:
Tc=72.8° C.
$T_L$<−20° C.
Δn=0.104
Δε=−5.1
$\eta_{20}$=38.3 mPa·s
VHR(25° C.)=99.2%
VHR(80° C.)=98.0%

EXAMPLE 9

The composition comprising the following components was prepared.

| Component I | |
|---|---|
| 3-H1SiB(2F,3F)-O2 | 5.0% |
| 5-H1SiB(2F,3F)-O2 | 5.0% |
| 2-HH1SiB(2F,3F)-O2 | 10.0% |
| 3-HH1SiB(2F,3F)-O2 | 12.0% |
| 3-HH1SiB(2F,3F)-O3 | 12.0% |
| Component II | |
| 3-HCF2OB(2F,3F)-O2 | 5.0% |
| 5-HHCF2OB(2F,3F)-O2 | 12.0% |
| 5-HBCF2OB(2F,3F)-O2 | 8.0% |
| 3-HCF2OBB(2F,3F)-O2 | 4.0% |
| 3-HChOCF2B(2F,3F)-O1 | 4.0% |
| 3-HHOCF2B(2F,3F)-O1 | 4.0% |
| 3-HB(2F,3F)OCF2B(2F,3F)-O2 | 8.0% |
| Component III | |
| V-HH-3 | 3.0% |
| 3-HB-O2 | 4.0% |
| 3-HH-EMe | 4.0% |

The composition had the following physical properties:
Tc=75.3° C.
$T_L$<−20° C.
Δn=0.098
Δε=−3.9
$\eta_{20}$=37.6 mPa·s
VHR(25° C.)=99.0%
VHR(80° C.)=98.3%

EXAMPLE 10

The composition comprising the following components was prepared.

| Component I | |
|---|---|
| 3-H1SiB(2F,3F)-O2 | 8.0% |
| 5-H1SiB(2F,3F)-O2 | 8.0% |
| 2-HH1SiB(2F,3F)-O2 | 10.0% |
| 3-HH1SiB(2F,3F)-O2 | 12.0% |
| 3-HH1SiB(2F,3F)-O3 | 10.0% |
| Component II | |
| 3-DhB(2F,3F)-O2 | 5.0% |
| 5-DhB(2F,3F)-O2 | 5.0% |
| Component III | |
| 3-HH-4 | 4.0% |
| 3-HEH-5 | 4.0% |
| 3-HB-O2 | 8.0% |
| 3-HEB-O3 | 4.0% |
| 4-HEB-O1 | 4.0% |
| 1O1-HBBH-4 | 6.0% |
| 1O1-HBBH-5 | 6.0% |
| 3-HBBH-3 | 3.0% |
| 3-HBB(F)H-3 | 3.0% |

The composition had the following physical properties:
Tc=84.3° C.
$T_L$<−20° C.
Δn=0.098
Δε=−2.9
$\eta_{20}$=30.0 mPa·s

EXAMPLE 11

The composition comprising the following components was prepared.

| Component I | |
|---|---|
| 3-H1SiB(2F,3F)-O2 | 5.0% |
| 5-H1SiB(2F,3F)-O2 | 5.0% |
| 2-HH1SiB(2F,3F)-O2 | 15.0% |
| 3-HH1SiB(2F,3F)-O2 | 15.0% |
| 3-HH1SiB(2F,3F)-O3 | 14.0% |
| 3-H2H1SiB(2F,3F)-O2 | 5.0% |
| 3-H1SiHB(2F,3F)-O2 | 5.0% |
| Component II | |
| 3-HHCF2OB(2F,3F)-1 | 4.0% |
| 3-HHCF2OB(2F,3F)-O2 | 6.0% |
| 5-HHCF2OB(2F,3F)-O2 | 5.0% |
| Component III | |
| 3-HB-O2 | 10.0% |
| 3-HB-O4 | 4.0% |
| 3-HEH-3 | 4.0% |
| 3-HHB-1 | 3.0% |

The composition had the following physical properties:
Tc=68.7° C.
$T_L$<−20° C.
Δn=0.094
Δε=−3.6
$\eta_{20}$=26.0 mPa·s

EXAMPLE 12

The composition comprising the following components was prepared.

| Component I | |
|---|---|
| 3-H1SiB(2F,3F)-O2 | 8.0% |
| 5-H1SiB(2F,3F)-O2 | 8.0% |
| 2-HH1SiB(2F,3F)-O2 | 10.0% |
| 3-HH1SiB(2F,3F)-O2 | 12.0% |
| 3-HH1SiB(2F,3F)-O3 | 6.0% |
| 3-HB1SiB(2F,3F)-O2 | 4.0% |
| Component II | |
| 3-HDhB(2F,3F)-O2 | 3.0% |
| 3-BDhB(2F,3F)-O2 | 3.0% |
| 5-HHCF2OB(2F,3F)-O2 | 3.0% |
| 5-HBCF2OB(2F,3F)-O2 | 3.0% |
| Component III | |
| 3-HB-O2 | 10.0% |
| 3-HH-EMe | 4.0% |
| 3-HEB-O3 | 4.0% |
| 4-HEB-O1 | 4.0% |
| 3-HHB-3 | 4.0% |
| 1O1-HBBH-4 | 7.0% |
| The other component | |
| 3-HHEBH-3 | 4.0% |
| 3-HHEBH-5 | 3.0% |

The composition had the following physical properties:
Tc=80.1° C.
$T_L$<−20° C.
Δn=0.098
Δε=−2.6
$\eta_{20}$=30.1 mPa·s

EXAMPLE 13

The composition comprising the following components was prepared

| Component I | |
|---|---|
| 3-H1SiB(2F,3F)-O2 | 5.0% |
| 3-HH1SiB(2F,3F)-O2 | 5.0% |
| Component II | |
| 3-DhB(2F,3F)-O2 | 7.0% |
| 3-HDhB(2F,3F)-O2 | 15.0% |
| 5-HDhB(2F,3F)-O2 | 15.0% |
| 3-BDhB(2F,3F)-O2 | 10.0% |
| Component III | |
| 2-HH-3 | 5.0% |
| 3-HH-4 | 5.0% |
| 3-HB-O2 | 4.0% |
| 3-HB-O4 | 5.0% |
| 3-HEH-3 | 4.0% |
| 3-HH-EMe | 4.0% |
| 3-HBBH-3 | 4.0% |
| 3-HBB(F)H-5 | 4.0% |
| The other component | |
| 3-HHEH-3 | 8.0% |

The composition had the following physical properties:
Tc=91.5° C.
$T_L$<−20° C.
Δn=0.089
Δε=−3.5
$\eta_{20}$=32.7 mPa·s

EXAMPLE 14

The composition comprising the following components was prepared.

| Component I | |
|---|---|
| 3-H1SiB(2F,3F)-O2 | 6.0% |
| 2-HH1SiB(2F,3F)-O2 | 6.0% |
| Component II | |
| 3-HCF2OB(2F,3F)-O2 | 5.0% |
| 3-HOCF2B(2F,3F)-O2 | 5.0% |
| 5-HHCF2OB(2F,3F)-O2 | 10.0% |
| 3-HCF2OHB(2F,3F)-O2 | 5.0% |
| 5-HBCF2OB(2F,3F)-O2 | 15.0% |
| 5-HChOCF2E(2F,3F)-O1 | 5.0% |
| 3-HBOCF2B(2F,3F)-O1 | 5.0% |
| Component III | |
| 3-HH-4 | 12.0% |
| 3-HB-O2 | 12.0% |
| 3-HH-EMe | 6.0% |
| 3-HHB-3 | 8.0% |

The composition had the following physical properties:

$T_c = 76.8°\ C.$ $T_L < -20°\ C.$ $\Delta n = 0.086$ $\Delta \epsilon = -2.6$ $\eta_{20} = 26.8\ mPa \cdot s$

EXAMPLE 15

The composition comprising the following components was prepared.

| Component I | |
|---|---|
| 2-HH1SiB(2F,3F)-O2 | 5.0% |
| 3-HH1SiB(2F,3F)-O2 | 6.0% |
| Component II | |
| 3-HDhB(2F,3F)-O2 | 6.0% |
| 5-HDhB(2F,3F)-O2 | 12.0% |
| 3-DhH2B(2F,3F)-O2 | 6.0% |
| 5-HHCF2OB(2F,3F)-O2 | 8.0% |
| 5-HBCF2OB(2F,3F)-O2 | 8.0% |
| 3-HChOCF2B(2F,3F)-O1 | 5.0% |
| 3-HDOCF2B(2F,3F)-O1 | 5.0% |
| Component III | |
| 3-HH-4 | 12.0% |
| V2-HH-4 | 5.0% |
| 3-HB-O2 | 12.0% |
| 2-HH-EMe | 4.0% |
| 3-HH-EMe | 6.0% |

The composition had the following physical properties:

$T_c = 87.5°\ C.$ $T_L < -20°\ C.$ $\Delta n = 0.087$ $\Delta \epsilon = -3.5$ $\eta_{20} = 29.5\ mPa \cdot s$

EXAMPLE 16

The composition comprising the following components was prepared.

| Component I | |
|---|---|
| 3-H1SiB(2F,3F)-O2 | 5.0% |
| 5-H1SiB(2F,3F)-O2 | 6.0% |
| 2-HH1SiD(2F,3F)-O2 | 6.0% |
| 3-HH1SiB(2F,3F)-O2 | 9.0% |
| 3-HB1SiB(2F,3F)-O2 | 3.0% |
| 3-H1SiHB(2F,3F)-O2 | 4.0% |
| Component II | |
| 3-DhB(2F,3F)-O2 | 5.0% |
| 3-HDhB(2F,3F)-O2 | 5.0% |
| V-HDhB(2F,3F)-O2 | 5.0% |
| 5-HDhB(2F,3F)-O2 | 11.0% |
| 3-BDhB(2F,3F)-O2 | 5.0% |
| Component III | |
| 2-HH-3 | 5.0% |
| V-HH-5 | 10.0% |
| 3-HB-O2 | 8.0% |
| 3-HB-O4 | 4.0% |
| V-HHB-3 | 3.0% |
| 1O1-HBBH-5 | 6.0% |

The composition had the following physical properties:

$T_c = 71.5°\ C.$ $T_L < -20°\ C.$ $\Delta n = 0.095$ $\Delta \epsilon = -3.5$ $\eta_{20} = 27.5\ mPa \cdot s$

EXAMPLE 17

The composition comprising the following components was prepared.

| Component I | |
|---|---|
| 3-H1SiB(2F,3F)-O2 | 5.0% |
| 5-H1SiB(2F,3F)-O2 | 5.0% |
| 2-HH1SiB(2F,3F)-O2 | 10.0% |
| 3-HH1SiB(2F,3F)-O2 | 12.0% |
| Component II | |
| 3-HCF2OB(2F,3F)-O2 | 8.0% |
| 3-HOCF2B(2F,3F)-O2 | 8.0% |
| 5-HHCF2OB(2F,3F)-O2 | 4.0% |
| 3-HChOCF2B(2F,3F)-O1 | 5.0% |
| 3-HB(2F,3F)OCF2B(2F,3F)-O1 | 5.0% |
| Component III | |
| 2-HH-3 | 5.0% |
| 3-HH-4 | 5.0% |
| 3-HB-O2 | 8.0% |
| 3-HB-O4 | 4.0% |
| 3-HHB-3 | 5.0% |
| 1O1-HBBH-5 | 6.0% |
| The other component | |
| 3-HHEH-3 | 5.0% |

The composition had the following physical properties:

$T_c = 65.2°\ C.$ $T_L < -20°\ C.$ $\Delta n = 0.084$ $\Delta \epsilon = -2.7$ $\eta_{20} = 24.6\ mPa \cdot s$

EXAMPLE 18

The composition comprising the following components was prepared.

| Component I | |
|---|---|
| 3-H1SiB(2F,3F)-O2 | 5.0% |
| 5-H1SiB(2F,3F)-O2 | 5.0% |
| 2-HH1SiB(2F,3F)-O2 | 10.0% |
| 3-HH1SiB(2F,3F)-O2 | 12.0% |
| Component II | |
| 3-HDhB(2F,3F)-O2 | 8.0% |
| 5-HDhB(2F,3F)-O2 | 8.0% |
| 3-HOCF2B(2F,3F)-O2 | 8.0% |
| 5-HHCF2OB(2F,3F)-O2 | 3.0% |
| 5-HBCF2OB(2F,3F)-O2 | 5.0% |
| Component III | |
| 2-HH-3 | 5.0% |
| 3-HH-4 | 8.0% |
| 3-HB-O2 | 8.0% |
| 3-HEB-O3 | 4.0% |
| 4-HEB-O1 | 4.0% |
| 3-HHB-3 | 3.0% |
| 1O1-HBBH-5 | 4.0% |

The composition had the following physical properties:

Tc=68.1° C.

$T_L$<−20° C.

$\Delta n$=0.086

$\Delta \epsilon$=−3.2

$\eta_{20}$=26.8 mPa·s

EXAMPLE 19

The composition comprising the following components was prepared.

| Component I | |
|---|---|
| 2-HH1SiB(2F,3F)-O2 | 6.0% |
| 3-HH1SiB(2F,3F)-O2 | 6.0% |
| Component II | |
| 3-HDhB(2F,3F)-O2 | 6.0% |
| 5-HDhB(2F,3F)-O2 | 6.0% |
| Component III | |
| 2-HH-3 | 6.0% |
| 3-HH-4 | 10.0% |
| 3-HB-O2 | 16.0% |
| 3-HB-O4 | 4.0% |
| 2-HH-EMe | 4.0% |
| 3-HH-EMe | 15.0% |
| 3-HHB-1 | 8.0% |
| 3-HHB-3 | 8.0% |
| 3-HHB-O1 | 5.0% |

The composition had the following physical properties:

Tc=80.4° C.

$T_L$<−20° C.

$\Delta n$=0.077

$\Delta \epsilon$=−1.4

$\eta_{20}$=14.3 mPa·s

EXAMPLE 20

The composition comprising the following components was prepared.

| Component I | |
|---|---|
| 3-H1SiB(2F,3F)-O2 | 7.0% |
| 3-HH1SiB(2F,3F)-O2 | 7.0% |
| Component II | |
| 5-HHCF2OB(2F,3F)-O2 | 6.0% |
| 5-HBCF2OB(2F,3F)-O2 | 4.0% |
| 5-HChOCF2B(2F,3F)-O1 | 5.0% |
| Component III | |
| 3-HH-4 | 12.0% |
| 3-HB-O2 | 16.0% |
| 3-HB-O4 | 4.0% |
| 2-HH-EMe | 5.0% |
| 3-HH-EMe | 16.0% |
| 3-HHB-1 | 8.0% |
| 3-HHB-3 | 10.0% |

The composition had the following physical properties:

Tc=71.6° C.

$T_L$<−20° C.

$\Delta n$=0.077

$\Delta \epsilon$=−1.1

$\eta_{20}$=14.4 mPa·s

EXAMPLE 21

The composition comprising the following components was prepared.

| Component I | |
|---|---|
| 3-H1SiB(2F,3F)-O2 | 7.0% |
| 3-HH1SiB(2F,3F)-O2 | 5.0% |
| 3-HH1SiB(2F,3F)-O3 | 5.0% |
| Component II | |
| 5-HDhB(2F,3F)-O3 | 6.0% |
| 3-HCF2OB(2F,3F)-O2 | 5.0% |
| 5-HBCF2OB(2F,3F)-O2 | 5.0% |
| Component III | |
| 3-HH-4 | 12.0% |
| 3-HB-O2 | 16.0% |
| 2-HH-EMe | 5.0% |
| 3-HH-EMe | 16.0% |
| 3-HHB-1 | 8.0% |
| 3-HHB-3 | 10.0% |

The composition had the following physical properties:

Tc=68.3° C.

$T_L$<−20° C.

$\Delta n$=0.076

$\Delta \epsilon$=−1.4

$\eta_{20}$ 32 15.3 mPa·s

EXAMPLE 22

The composition comprising the following components was prepared.

| Component I | |
|---|---|
| 2-HH1SiB(2F,3F)-O2 | 10.0% |
| 3-HH1SiB(2F,3F)-O2 | 7.0% |
| 3-HB1SiB(2F,3F)-O2 | 3.0% |
| Component II | |
| 3-DhB(2F,3F)-O2 | 5.0% |
| 3-HDhB(2F,3F)-O2 | 10.0% |
| 5-HDhB(2F,3F)-O2 | 10.0% |
| 3-BDhB(2F,3F)-O2 | 5.0% |
| Component III | |
| 3-HH-4 | 8.0% |
| 3-HB-O2 | 8.0% |
| 3-HH-EMe | 5.0% |
| 3-HHB-3 | 4.0% |
| 3-HBBH-3 | 5.0% |
| Component IV | |
| 3-HB(2F,3F)-O2 | 5.0% |
| 5-HB(2F,3F)-O2 | 5.0% |
| 3-HBB(2F,3F)-O2 | 5.0% |
| 3-HHB(2F,3F)-O2 | 5.0% |

The composition had the following physical properties:
Tc=90.3° C.
$T_L$<-20° C.
$\Delta n$=0.100
$\Delta \epsilon$=-4.1
$\eta_{20}$=33.3 mPa·s

EXAMPLE 23

The composition comprising the following components was prepared.

| Component I | |
|---|---|
| 3-H1SiB(2F,3F)-O2 | 6.0% |
| 2-HH1SiB(2F,3F)-O2 | 6.0% |
| 3-HH1SiB(2F,3F)-O2 | 6.0% |
| Component II | |
| 3-HOCF2B(2F,3F)-O2 | 10.0% |
| 5-HHCF2OB(2F,3F)-O2 | 10.0% |
| 3-HChOCF2B(2F,3F)-O1 | 5.0% |
| Component III | |
| 3-HH-4 | 8.0% |
| 3-HH-EMe | 5.0% |
| 3-HHB-3 | 4.0% |
| Component IV | |
| 3-HB(2F,3F)-O2 | 4.0% |
| 3-H2B(2F,3F)-O2 | 4.0% |
| 5-HB(2F,3F)-O2 | 8.0% |
| 5-HBB(2F,3F)-3 | 4.0% |
| 3-HBB(2F,3F)-O2 | 6.0% |
| 3-H2BB(2F,3F)-O2 | 4.0% |
| 3-HHB(2F,3F)-O2 | 6.0% |
| V-HHB(2F,3F)-O2 | 4.0% |

The composition had the following physical properties:
Tc=78.1° C.
$T_L$<-20° C.
$\Delta n$=0.100
$\Delta \epsilon$=-3.8
$\eta_{20}$=31.0 mPa·s

EXAMPLE 24

The composition comprising the following components was prepared.

| Component I | |
|---|---|
| 3-H1SiB(2F,3F)-O2 | 5.0% |
| 5-H1SiB(2F,3F)-O2 | 5.0% |
| 2-HH1SiB(2F,3F)-O2 | 10.0% |
| 3-HH1SiB(2F,3F)-O2 | 10.0% |
| Component II | |
| 3-HDhB(2F,3F)-O2 | 5.0% |
| 5-HDhB(2F,3F)-O2 | 5.0% |
| 3-HHCF2OB(2F,3F)-O2 | 5.0% |
| 3-HBCF2OB(2F,3F)-O2 | 5.0% |
| Component III | |
| 2-HH-5 | 4.0% |
| 3-HH-4 | 4.0% |
| 3-HB-O2 | 4.0% |
| 3-HB-O4 | 4.0% |
| 3-HHB-3 | 4.0% |
| Component IV | |
| 3-HB(2F,3F)-O2 | 5.0% |
| V-HB(2F,3F)-O2 | 5.0% |
| 3-HBB(2F,3F)-O2 | 5.0% |
| V-HBB(2F,3F)-O2 | 5.0% |
| 3-HHB(2F,3F)-O2 | 5.0% |
| 5-HHB(2F,3F)-O2 | 5.0% |

The composition had the following physical properties:
Tc=79.0° C.
$T_L$<-20° C.
$\Delta n$=0.103
$\Delta \epsilon$=-4.1
$\eta_{20}$=28.5 mPa·s
VHR(25° C.)=99.1%
VHR(80° C.)=97.9%

EXAMPLE 25

The composition comprising the following components was prepared.

| Component I | |
|---|---|
| 3-H1SiB(2F,3F)-O2 | 9.0% |
| 5-H1SiB(2F,3F)-O2 | 8.0% |
| 3-HH1SiB(2F,3F)-O2 | 12.0% |
| 5-HH1SiB(2F,3F)-O2 | 6.0% |
| 3-HH1SiB(2F,3F)-O3 | 12.0% |
| Component II | |
| 3-HBOCF2B(2F,3F)-O2 | 16.0% |
| 5-HBOCF2B(2F,3F)-O2 | 16.0% |
| Component III | |
| 3-HH-4 | 11.0% |
| 3-HB-O2 | 10.0% |

The composition had the following physical properties:
Tc=62.3° C.
$T_L$<-20° C.
$\Delta n$=0.095
$\Delta \epsilon$=-3.7
$\eta_{20}$=28.6 mPa·s
VHR(25° C.)=98.8%
VHR(80° C.)=97.8%

EXAMPLE 26

The composition comprising the following components was prepared.

| Component I | |
|---|---|
| 3-H1SiB(2F,3F)-O2 | 10.0% |
| 5-H1SiB(2F,3F)-O2 | 9.0% |
| 3-HH1SiB(2F,3F)-O2 | 12.0% |
| 5-HH1SiB(2F,3F)-O2 | 5.0% |
| 3-HH1SiB(2F,3F)-O3 | 12.0% |
| Component II | |
| 3-HHCF2OB(2F,3F)-O2 | 14.0% |
| 5-HHCF2OB(2F,3F)-O2 | 14.0% |
| Component III | |
| 3-HH-4 | 11.0% |
| 3-HB-O2 | 13.0% |

The composition had the following physical properties:

Tc=69.4° C.

$T_L$<−20° C.

Δn=0.085

Δε=−3.4

$\eta_{20}$=26.5 mPa·s

VHR(25° C.)=99.0%

VHR(80° C.)=98.2%

INDUSTRIAL APPLICABILITY

As shown in the Examples, the present invention provides a liquid crystal composition which has a suitable Δn in accordance with cell thickness, in particular a largely negative dielectric anisotropy, a broad nematic liquid crystal phase range, a high voltage holding ratio and a low viscosity while satisfying various properties required for liquid crystal compositions for AM-LCD.

What is claimed is:

1. A liquid crystal composition comprising Component I selected from the group consisting of the compounds represented by formula (I), Component II selected from the group consisting of the compounds represented by formula (II) and Component III selected from the group consisting of the compounds represented by formulas (III-1) and (III-2)

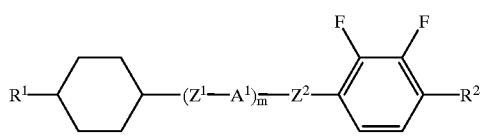
(I)

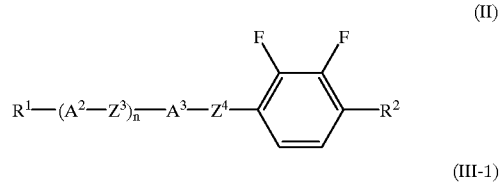
(II)

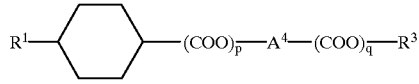
(III-1)

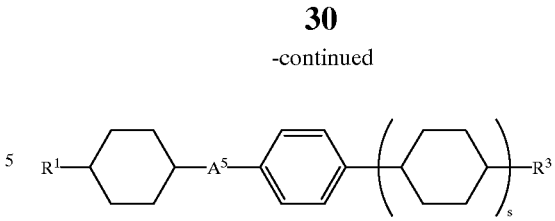
(III-2)

wherein each $R^1$ independently represents an alkyl group having 1–10 carbon atoms or an alkenyl group having 2–10 carbon atoms; each $R^2$ independently represents an alkyl or alkoxy group having 1–10 carbon atoms, or an alkenyl group having 2–10 carbon atoms; $Z^1$ and $Z^2$ represent —CH$_2$SiH$_2$—, a single bond or —CH$_2$CH$_2$—, with the proviso that one of $Z^1$ and $Z^2$ represents —CH$_2$SiH$_2$— and the other represents a single bond or —CH$_2$CH$_2$—; ring $A^1$ represents a trans-1,4-cyclohexylene group, or a 1,4-phenylene group in which one or more hydrogen atoms may be substituted with fluorine atoms; m is 0 or 1, with the proviso that when m is 0, $Z^2$ represents —CH$_2$SiH$_2$—; $Z^3$ and $Z^4$ each independently represent a single bond, —CH$_2$CH$_2$—, —CF$_2$O— or —OCF$_2$—; rings $A^2$ and $A^3$ represent a tetrahydropyran-2,5-diyl group, a trans-1,4-cyclohexylene group, a cyclohexa-1-ene-1,4-diyl group, or a 1,4-phenylene group in which one or more hydrogen atoms may be substituted with fluorine atoms; n is 0 or 1; with the proviso that when n=0 and $Z^4$ represents a single bond or —CH$_2$CH$_2$—, then ring $A^3$ represents a tetrahydropyran-2,5-diyl group; when n=0 and $Z^4$ represents —CF$_2$O— or —OCF$_2$—, then ring $A^3$ represents a trans-1,4-cyclohexylene group or a cyclohexa-1-ene-1,4-diyl group; when n=1 and $Z^3$ and $Z^4$ each independently represent a single bond or —CH$_2$CH$_2$—, then one of rings $A^2$ and $A^3$ represents a tetrahydropyran-2,5-diyl group; when n=1 and $Z^3$ and/or $Z^4$ represent —CF$_2$O— or —OCF$_2$—, then rings $A^2$ and $A^3$ represent a trans-1,4-cyclohexylene group, a cyclohexa-1-ene-1,4-diyl group, or a 1,4-phenylene group in which one or more hydrogen atoms may be substituted with fluorine atoms; each $R^3$ independently represents an alkyl group having 1–10 carbon atoms or an alkenyl group having 2–10 carbon atoms, in which one —CH$_2$— may be substituted with —O—; ring $A^4$ represents a 1,4-phenylene group or a trans-1,4-cyclohexylene group; ring $A^5$ represents a trans-1,4-cyclohexylene group, or a 1,4-phenylene group in which one or more hydrogen atoms may be substituted with fluorine atoms; p, q and s are each independently 0 or 1 with the proviso that (p+q) is 0 or 1.

2. A liquid crystal composition as claimed in claim 1, which comprises 3–80% by weight of Component I, 3–80% by weight of Component II and 1–80% by weight of Component III.

3. A liquid crystal composition as claimed in claim 1, which further comprises Component IV selected from the group consisting of the compounds represented by formula (IV)

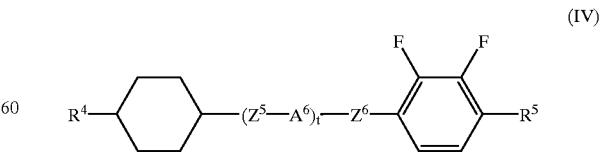
(IV)

wherein $R^4$ represents an alkyl group having 1–10 carbon atoms or an alkenyl group having 2–10 carbon atoms, $R^5$ represents an alkyl or alkoxy group having 1–10 carbon atoms or an alkenyl group having 2–10 carbon atoms, $Z^5$ and $Z^6$ each independently represent a single bond or —CH$_2$CH$_2$—, ring A$^6$ represents a 1,4-phenylene group or a trans-1,4-cyclohexylene group, and t is 0 or 1.

4. A liquid crystal composition as claimed in claim 1, wherein the clearing point (Tc) is 60 to 100° C., the refractive anisotropy (Δn) is 0.06 to 0.12 and the dielectric anisotropy (Δε) is −6 to −1.

5. A liquid crystal display element containing the liquid crystal composition as claimed in claim 1.

* * * * *

UNITED STATES PATENT AND TRADEMARK OFFICE
CERTIFICATE OF CORRECTION

PATENT NO. : 6,395,353 B2
DATED : May 28, 2002
INVENTOR(S) : Motoki Yanai et al.

It is certified that error appears in the above-identified patent and that said Letters Patent is hereby corrected as shown below:

Column 23,
Line 28, change "$\eta_{20}32\ 26.8$ mPa•s" to -- $\eta_{20} = 26.8$ mPa•s --;
Line 47, change "3-HDOCF2B(2F,3F)-O1" to -- 3-HBOCF2B(2F,3F)-O1 --.

Column 24,
Line 7, change "2-HH1SiD(2F,3F)-O2" to -- 2-HH1SiB(2F,3F)-O2 --.

Column 29,
Line 36, change "An" to -- $\Delta$n --.

Signed and Sealed this

Fifth Day of November, 2002

Attest:

JAMES E. ROGAN
*Attesting Officer*　　*Director of the United States Patent and Trademark Office*